J. W. HOWELL.
WELDING FILAMENTS TO METAL WIRES.
APPLICATION FILED MAR. 16, 1907.
1,022,554.
Patented Apr. 9, 1912.
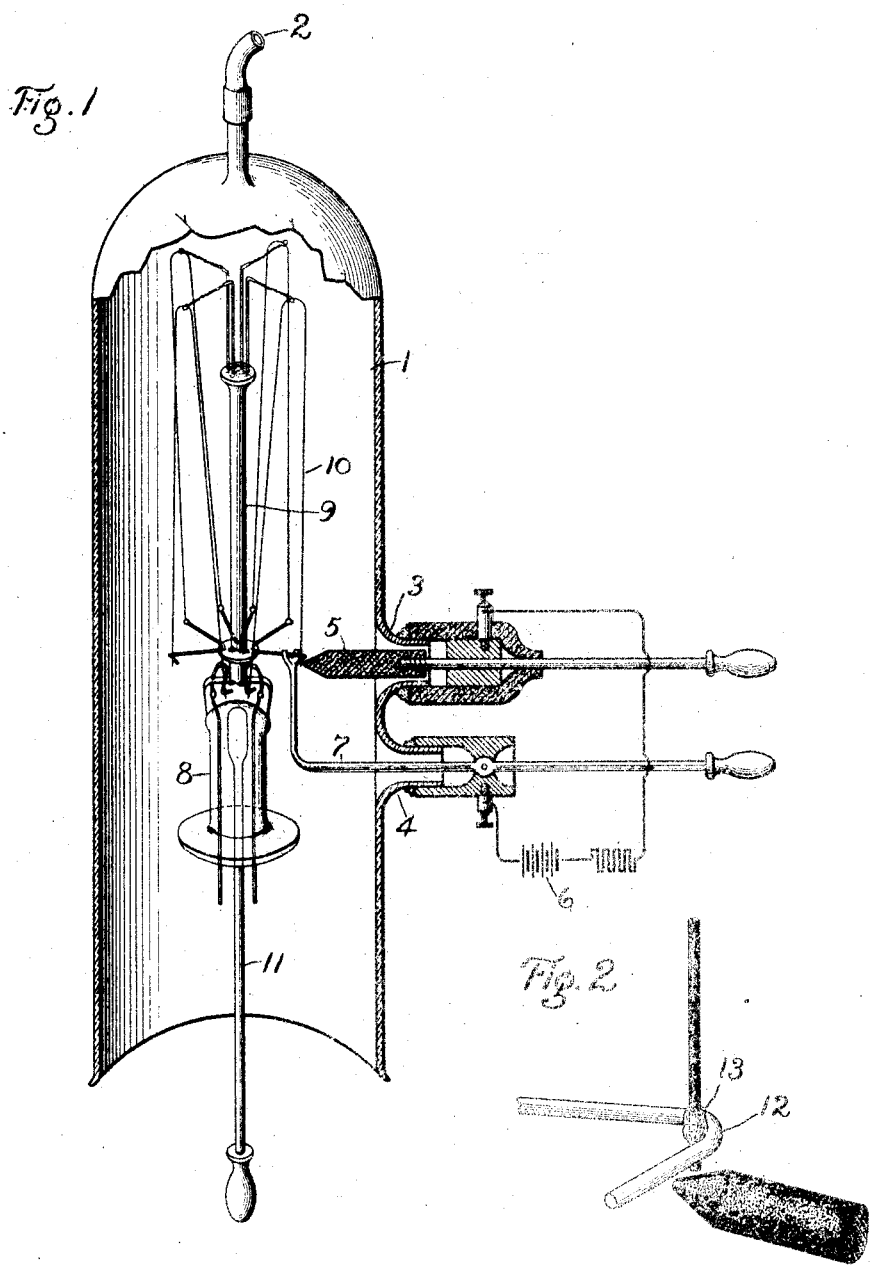
WITNESSES:
Lester H. Fulmer
J. Ellis Glen
INVENTOR
JOHN W. HOWELL.
BY
ATT'Y.

UNITED STATES PATENT OFFICE.

JOHN W. HOWELL, OF NEWARK, NEW JERSEY, ASSIGNOR TO GENERAL ELECTRIC COMPANY, A CORPORATION OF NEW YORK.

WELDING FILAMENTS TO METAL WIRES.

1,022,554. Specification of Letters Patent. Patented Apr. 9, 1912.

Application filed March 16, 1907. Serial No. 362,611.

*To all whom it may concern:*

Be it known that I, JOHN W. HOWELL, a citizen of the United States, residing at Newark, county of Essex, State of New Jersey, have invented certain new and useful Improvements in Welding Filaments to Metal Wires, of which the following is a specification.

Tungsten lamp filaments can be provided with leading-in conductors of platinum or of nickel-iron alloy, and the joint between the filament and the leading-in conductor can be made by fusing the end of the platinum or nickel-iron wire to the tungsten filament. This welding operation may be conveniently carried out by first forming a hook in the platinum or nickel-iron wire and arranging the tungsten filament in the bend of the hook, and then touching the end of the hook with a carbon electrode and drawing an arc to melt the end of the wire. The melted metal gathers in a globule and the tungsten filament takes up a position in the center of the globule. If the fusing action is continued, the globule of metal travels backward along the wire, and the tungsten filament moves with the globule and maintains substantially its central position. This operation is relatively easy with the two metals above mentioned, but I find that it is by no means the same when the leading-in conductor consists of copper. Copper does not alloy with tungsten and the filament does not show the same tendency to take up the central position with respect to the globule.

My present invention comprises a method whereby refractory metal filaments, such as tungsten, may be electrically welded to a less refractory wire, even though the latter consists of a metal which does not readily alloy with the metal of the filament. In carrying out this process I utilize a paste capable of combining with both materials and fluxing the joint during the welding operation.

An apparatus suitable for carrying out my process is shown in the drawing annexed to and forming a part of this specification.

Figure 1 is a sectional elevation of a treating vessel equipped with electrodes suitable for producing the welding operation; Fig. 2 is an enlarged view of the joint before welding and illustrates the position of the flux or paste.

The treating bottle or envelop 1 may be of glass and provided with an inlet 2 at the top through which an inert gas such as hydrogen can be introduced. The vessel is provided with openings 3 and 4 through the side. A carbon electrode 5 suitably connected to a current source 6 can be introduced through opening 3 to serve as one electrode for the welding arc. A conductive wire or standard 7 passes through opening 4 and serves to connect the other side of the source of electrical energy with the parts under treatment.

A lamp stem 8 carrying a glass pedestal 9 and a plurality of metal filaments 10, may be held in position with respect to the welding electrodes by means of a handle 11. When the filaments are assembled on the spider I arrange an end of each filament in a small hook 12 at the end of each leading-in conductor. In case the filament consists of tungsten and the leading-in conductor consists of copper, I use a paste made by mixing finely divided iron with a little gum arabic. When this paste is applied, as indicated at 13 in Fig. 2, it serves to hold the filament in the hooked end of the leading-in conductor. This is a great convenience in the handling of the spider before the welding operation is performed. The most important function of this paste, however, is to flux the joint during the welding operation.

When an arc is produced between electrode 5 and the end of the leading-in conductor, the arc melts down the conductor and forms a globule of metal which alloys with the iron and causes the iron to alloy with the tungsten. The whole mass gathers together in a globule with the filament centrally located therein.

It will be understood that my invention is applicable to the welding of other filaments than tungsten, and that the paste or flux should be of such a nature as to combine or alloy with both the filament and the leading-in wire. Finely divided iron is a good flux for tungsten and copper, but other fluxing materials could be used.

What I claim as new and desire to secure by Letters Patent of the United States, is,

1. The method of joining a tungsten filament to a copper wire, which consists in pasting the junction with finely divided iron and then melting the copper at the junction about the filament so that the filament may be embedded in the fused metal.

2. The combination of a tungsten filament, and a copper conductor electrically connected therewith at a welded joint containing iron.

3. The combination of a tungsten filament and a conductor electrically connected therewith at a welded joint containing copper and iron.

4. The method of connecting a refractory metal filament and a metallic member of material inert with respect thereto which consists in fusing a portion of said member about said filament and fluxing the joint with material which causes the filament to maintain a central position with respect to the mass of molten metal.

5. An electric glow lamp comprising a tungsten filament attached to the melted ends of supports containing two metals one of which has the property of forming an alloy with tungsten while the other has the contrary property.

6. An electric glow lamp comprising a tungsten filament attached to the ends of supports containing a metal of the iron group and a metal of the copper group.

In witness whereof I have hereunto set my hand this 8th day of March, 1907.

JOHN W. HOWELL.

Witnesses:
J. HARRY ELKINS,
S. N. WHITEHEAD.